United States Patent [19]

Antal et al.

[11] Patent Number: 4,741,794

[45] Date of Patent: * May 3, 1988

[54] EQUIPMENT FOR THE MANUFACTURE OF MAINLY LARGE-DIAMETER FLEXIBLE HOSES HAVING SPIRALLED REINFORCEMENT

[75] Inventors: Sándor Antal; Péter Smaroglay, both of Budapest, Hungary

[73] Assignee: Taurus Gumiipari Vállalat, Budapest, Hungary

[*] Notice: The portion of the term of this patent subsequent to Apr. 3, 2005 has been disclaimed.

[21] Appl. No.: 693,240

[22] Filed: Jan. 22, 1985

Related U.S. Application Data

[63] Continuation of Ser. No. 412,451, Aug. 27, 1982, abandoned.

[30] Foreign Application Priority Data

Sep. 3, 1981 [HU] Hungary .............................. 2553/81

[51] Int. Cl.4 .............................................. B65H 81/00
[52] U.S. Cl. ...................................... 156/429; 156/431
[58] Field of Search .............. 156/428, 430, 431, 432, 156/383, 172, 175, 128, 381, 382; 242/7.21, 7.22; 57/11, 8, 169

[56] References Cited

U.S. PATENT DOCUMENTS

| 2,344,264 | 3/1944 | Perrault | 242/11 |
| 2,967,390 | 1/1961 | McCormick | 57/11 |
| 3,032,461 | 5/1962 | Baker et al. | 156/175 |
| 3,201,298 | 8/1962 | Baker et al. | 156/431 |
| 3,788,918 | 1/1974 | Poulsen | 156/171 |
| 3,960,629 | 6/1976 | Goldsworthy | 156/180 |
| 4,028,164 | 6/1977 | Montagut | 156/173 |
| 4,089,727 | 5/1978 | Mclain | 156/350 |
| 4,313,777 | 2/1982 | Buckley et al. | 156/272 |

FOREIGN PATENT DOCUMENTS

921486 3/1963 United Kingdom .

Primary Examiner—Michael Ball
Attorney, Agent, or Firm—Gabriel P. Katona

[57] ABSTRACT

There is disclosed an improved apparatus for making flexible hoses comprising a means for storing and unwinding reinforcing threads needed for hose building, said means comprising a set of joinable drum storing platforms as a thread applying means capable of simultaneously applying reinforcing threads in the order of magnitude of a thousand to the flexible hose to be manufactured; at least one driving mechanism being capable of positively gripping any part of the hose and being capable of advancing or advancing and rotating the hose; optional input means for supplying heat, e.g. electric current, to said hose for vulcanization or other heat treatment; supplementary support means for allowing and promoting the advancing or the advancing and rotating movement of the hose, said support means being arranged along a track of hose movement of any desired shape; and elements of adjustable height located within a track section of the driving mechanism wherein the height of said elements is preferably set and controlled automatically by the hose itself while it is being built up from its component parts.

5 Claims, 6 Drawing Sheets

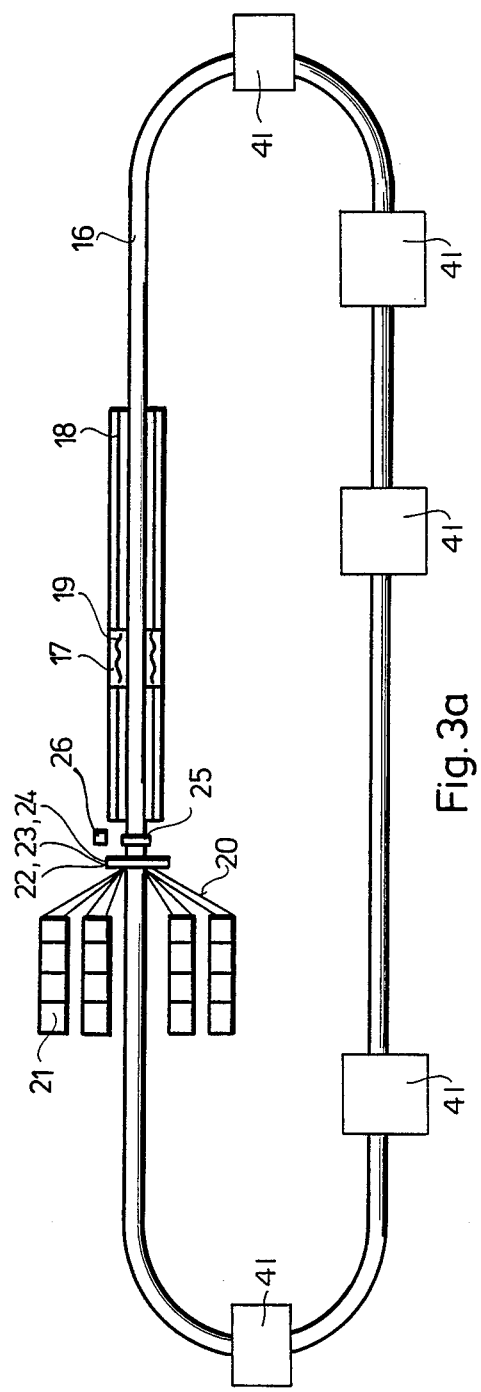
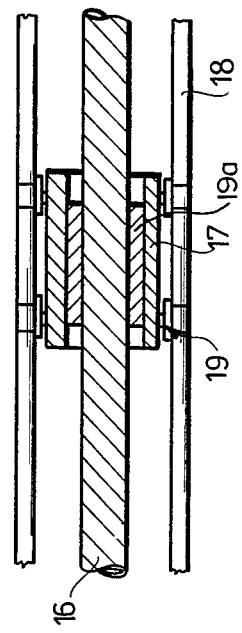
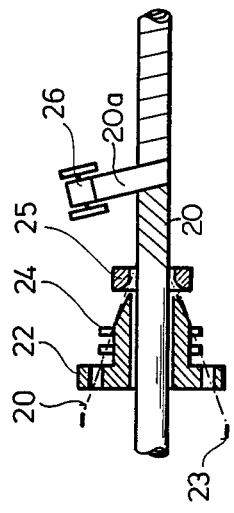
Fig. 3a
Fig. 3c
Fig. 3b

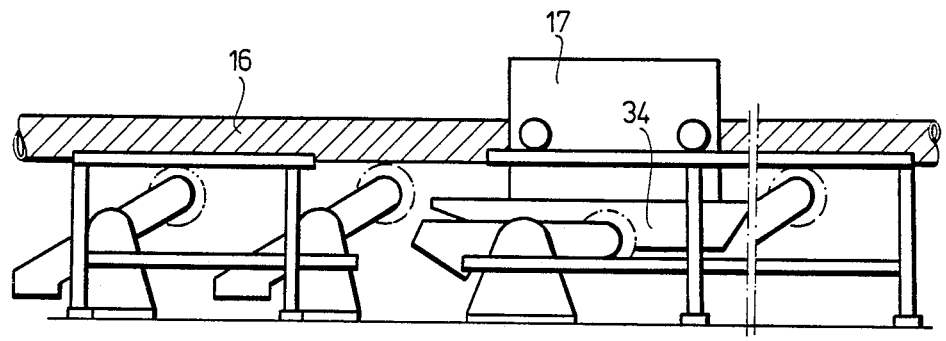
Fig. 4a
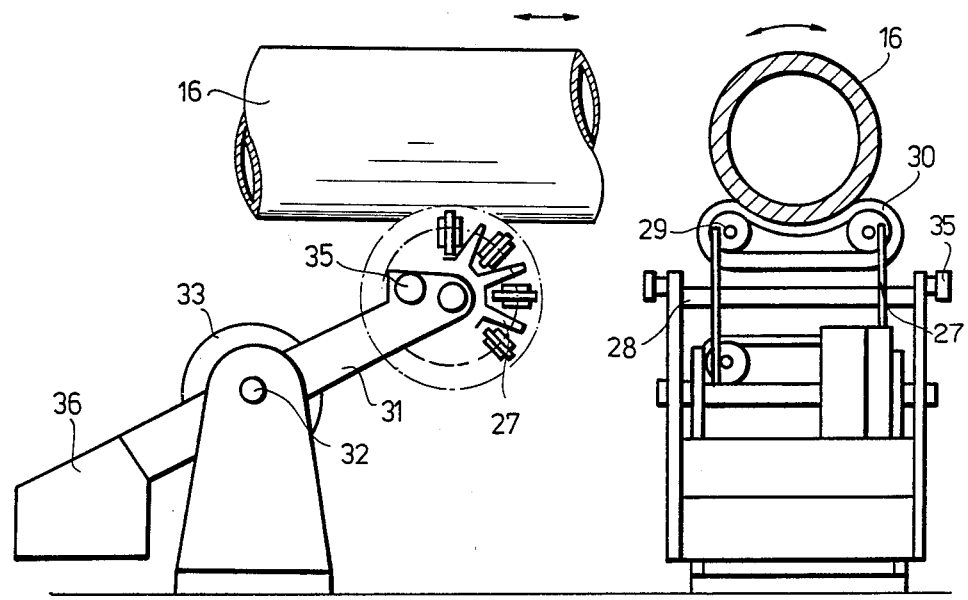
Fig. 4b
Fig. 4c

EQUIPMENT FOR THE MANUFACTURE OF MAINLY LARGE-DIAMETER FLEXIBLE HOSES HAVING SPIRALLED REINFORCEMENT

This is a continuing application of application Ser. No. 412,451, filed on Aug. 27, 1982, now abandoned.

BACKGROUND

This invention relates to an apparatus for the manufacture of mainly large-diameter flexible hoses having spiralled reinforcement.

It is well known that pressure-tight flexible tubes of various sizes are used increasingly all over the world. The demand for such hoses has sharply increased mainly in the field of exploring crude oil and natural gas and also in the fields of exploitation and transport of same. Demands are increasingly high for hose products having larger sizes, improved pressure resistance and higher quality.

Various machines with different operational principles have been heretofore available. It has always been a most difficult technical problem to uniformly locate the reinforcing threads that are applied so as to provide an improved resistance against pressure and other mechanical effects, while providing uniformity of diameter and thread strength shall also be provided for. Apparatus manufactured for this purpose only have been able to produce flexible tubes having small bores and a low number of reinforcing threads. Hungarian Pat. No. 154,707 discloses that to meet quality requirements the best method is to simultaneously apply the reinforcing threads of each layer onto the flexible tube base. In this way a harmful deformation of the base structure caused by non-uniformity of the reinforcement's diameter can be avoided.

There has been no means available for making large-diameter flexible tubes containing reinforcing plies of thread-layers whereby the building-up of all the reinforcing threads of one layer would be completed simultaneously. However, the use of such method could improve not only the quality of products but also the capacity of the apparatus. The difficulty in solving said problem lies in that hundreds of thread drums would have to be located and the guiding and handling of such a great number of threads are so difficult that in known apparatus only a few threads can be applied onto the surface of the base tube in one step while that process has to be repeated several times. Hungarian Pat. No. 154 707 describes a fibre guiding system where the drums are located over the level of the apparatus. This method provides the best possibility among the methods heretofore known for guiding a higher number of threads when using a fixed guiding system. However, this known method cannot provide for the positioning of, e.g. a thousand bobbins, though this requirement is very often demanded. Because of the difficulties mentioned above, various second-best solutions have been forced to be adopted. According to one of these solutions the base is cured first before applying the reinforcing threads and the several plies of reinforcement required are applied in subsequent steps. Though the disadvantageous deformation of the base can be remarkably reduced, it cannot be fully eliminated. The capacity of this known machine is low because of the repeated thread applying operation. By another method suggested it is proposed to calender parallely guided reinforcing threads into thin rubber sheets. That means that the reinforcement is first located between rubber sheets having a thickness of some mms and the cylindrical surface and the flexible tube is then covered by these reinforced sheets. The application of said known method causes a lot of problems: the sheets containing reinforcement cannot follow, in the case of steel cords, for instance, deviations from the theoretically cylindrical surface of the base structure. Again, in the case of steel cords, the edges of the reinforcement are because of the same reason, either overlapped or there arise gaps between the edges. For the production of steel cords an expensive, separate apparatus which is independent from the hose building-up process is needed.

It is also known that the number of threads cannot be increased economically when fixed thread guiding systems are used because their location may only extend to two dimensions that is, the drums or bobbins can be located in one plane only. Three-dimensional systems cannot be developed at all, or they are limited to certain forms. In the latter the space exploitation factor available is very low because enough access space should be provided for refilling or replacing the drums or bobbins.

The main object of the present invention is to provide an apparatus which is substantially free of the limitations described above.

SUMMARY OF THE INVENTION

According to present invention it has been found that to provide a better utilization of space, means for storing and unwinding, the drums of reinforcing threads should be provided by forming separate platform-units. Horizontally extending load units may extend from there platform-units, and by putting one onto the top of the other upto a rational height several load-units can be located, one behind the other. That way many drums can be stored within a small area of low volume because it is not necessary to provide for a service place between the drums.

When applying the present invention, the hose is to be guided along a curved track.

The shape of said curved track may depend on the shape of the building available and also on the lengths of the hose to be manufactured.

The best shape suggested is that of an alongated O, which shapes other than that can also be used. In any case, a track having a shape of a closed curve is recommended. Such curved tracks allow for the application of substantially large bending radii which do not cause any damage to the hose construction during building-up operation, and the curved shape of the track, also led through on various levels, allows the building-up of hoses of lengths required in any kind of building that is available.

To provide for a proper drive of the hose along said curved track, at least one, but, depending on the length, shape and strength of the hose construction, normally more driving mechanisms are required. This is needed to transmit advancing force to the hose, as well as a proper torque when the hose also revolves during advancing. The number of said driving mechanisms is to be determined in a manner that no damage accurs to the hose structure when power and torque are transmitted. It is obvious that the higher the number of the power and torque transmitting sites, the lower their value is at each site. It means that the load on the hose structure is substantially lowered by applying several driving mechanisms. Supplementary means used to support the system, are preferably structures that allow for both an advancing and a rotating movement of the hose. Wheels for instance, which are equipped with rollers, mounted along the periphery and perpendicularly to the plane of said wheel (two dimensional rollers) are very suitable for that purpose.

The equipment according to the present invention provides advantages not only in the building-up phase of hose manufacture but also in the cure and heat treatment phases when compared with presently used apparatus. It has been recognized that by the use of electrical heating means located along the curved track of hose advancing in one layer only the built-up hose can be cured and heat-treated very advantageously. In case of a hose built-up and advanced along a curved track, electric power can be introduced either to both ends of the hose or to shorter parts of the hose, and the reinforcement can be used as an electric resistance, the hose can be heated to a temperature required and also cured. This method implies several advantages.

The heat is produced internally in the hose itself. Therefore, loss of heat is minimal. The curing process occurs by moving from inside to outside. Thus always the elastomer area around the reinforcement will be warmed-up first, and after it is softened, the space will be filled properly by the gripping, pressing effect of the outer area around it. Because of this good filling, adhesion of the plies is improved considerably when compared to conventionally used curing or vulcanizing.

Thus, this invention provides apparatus having (a) a means for storing and unwinding reinforcing threads needed for hose building, said means comprising a set of joinable drum storing platforms as a thread applying means capable of simultaneously applying reinforcing threads in the order of magnitude of a thousand to the flexible hose to be manufactured; (b) at least one driving mechanism capable of positively gripping preferably any part of the hose, said driving mechanism being suitable for advancing or for advancing and rotating the hose; (c) optional input means for supplying heat, e.g. electric current, to said hose for vulcanization or for any other kind of heat treatment when desired; (d) supplementary support means for allowing and promoting the advancing or the advancing and rotating movement of the hose, said support means being arranged along a track of hose movement of any desired shape; (e) also elements of adjustable height located within a track section of the driving mechanism wherein the height of said elements is preferably set and controlled automatically by the hose itself while it is being built up from its component parts.

Preferred embodiments of the apparatus according to the invention may have supplementary means providing a proper fixing of the reinforcement during manufacture.

The apparatus of the present invention can be designed and constructed including a great variety of several technical solutions and the proper type of machine can be selected by experts on the basic of the principles and the knowledge as described here.

BRIEF DESCRIPTION OF THE DRAWINGS

The invention may be more clearly understood from the following detailed description of a preferred embodiment, by way of example only, with reference to the attached drawing, where FIG. 3a is the schematic lay-out of the total apparatus, FIG. 3b shows the applying means of a fixing layer schematically, FIG. 3c illustrates the hose driving mechanism schematically, FIG. 4a shows the supplementary hose supporting means system in side-view, schematically, FIG. 4b shows one hose supporting means in side-view, FIG. 4c shows one hose supporting means as a perspectivic view from a perpendicular direction to the axis of the built-up hose.

Figure 1A:
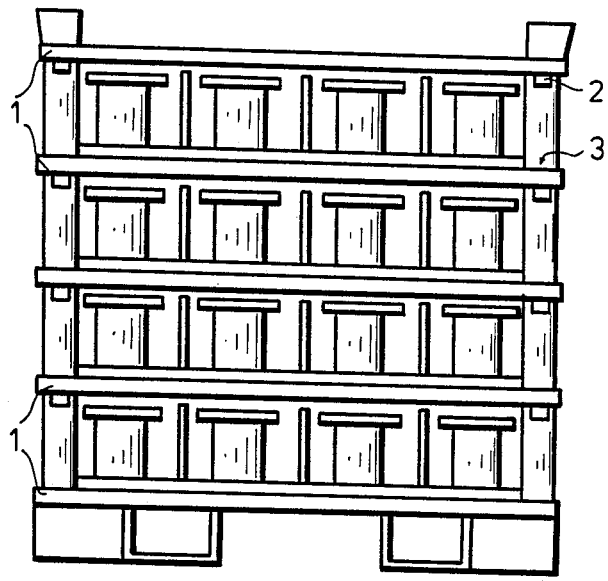
FIG. 1a illustrates the platform system of small drums in front view.
Figure 1C:
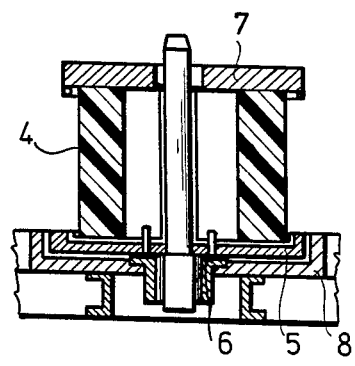
FIG. 1c shows a drum in section.
Figure 1B:
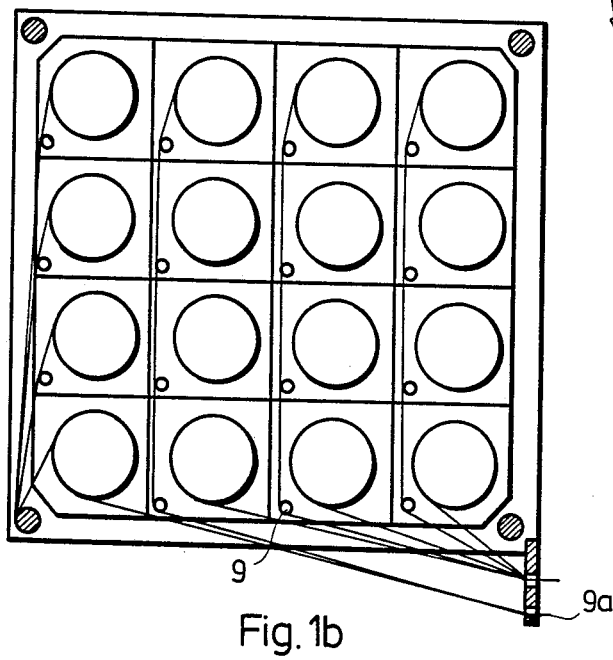
FIG. 1b shows the top-view of the system.

An embodiment of the unwinding system's basic unit is shown in FIGS. 1a-1c by way of example only.

DETAILED DESCRIPTION

The system illustrated in the figures, shown above is designed to use middle-size drums. An unwinding unit consists of a plurality joining horizontal platforms 1. The upper platform 1 is joined with studs 2 to sleeves 3 of the lower platform. The lowest platform 1 is designed so that all platforms 1 can be lifted by fork lift truck and the platforms compose one set. Said sets can also be superpositioned.

Drums 4 are located vertically on the platforms 1. The drums 4 are seated to a conical sunk mounts of discs 5, equipped with bearings and having vertical axis. Friction plies 6 are provided to discs 5. The friction torque is defined by the weight of the drum and a brake-weight 7 to be positioned, or by a spring designed properly. Said friction torque prevents the free running of the drums.

If a thread wound around the vertical drums 4 still begins to get loose, thread cannot run under the drum because the edge of the drum sits in the conical disc 5 and the clearance between the conical disc 5 and the basic plate 8 is considerably smaller than the thread itself. Thus a loose thread returns back onto the drum. Loosening can also be prevented by prolonging the brake-time of the building-up mechanism.

With vertically aligned drums used previously there was a permanent problem, i.e. to prevent the running of the thread under the drum. This can cause trouble on one hand in that the loose threads will be kinked in cables formed during the hose building-up operation, while on the other hand, in the case of vertically aligned drums, wire or thread may run under the edge of the drum and it may be broken.

The problem of loosening could previously be overcome only by the application of very expensive means, by D.C. motors for instance, which can produce a certain counter-torque. On the platforms 1 of the invention only the running through of the drums is prevented. The exact braking of the threads will be dealt with later. Threads are led further by drifts 9 and by a thread-aligner 9/a.

Figure 2A:
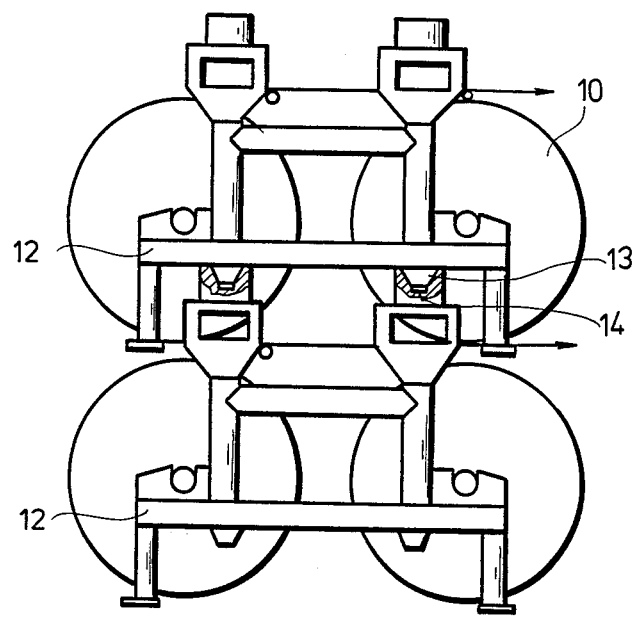
FIG. 2a illustrates the platform system of big drums in front view.
Figure 2B:
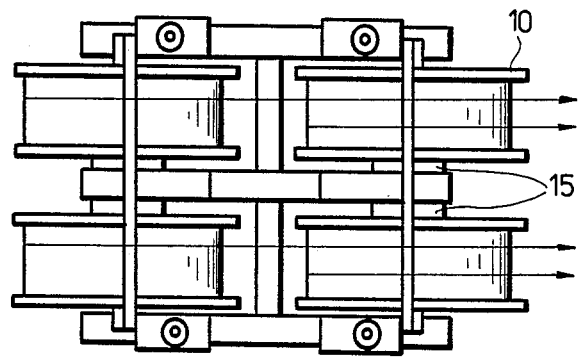
FIG. 2b shows the top-view of the system.

In case of drums 10 having large diameters, platforms 12 are used as shown in FIGS. 2-2b. The platforms are composed of load-units which can be transported by trolleys from the place of storing to the place of unwinding. The axis of drums 10 is horizontal. Platforms 12 can be joined by means of studs 13 and sleeves, to each other. The running through of the drums is prevented by means of brakes 15.

The number of said load-units shown in FIGS. 1 and 2 is determined by the required number of reinforcing threads for the hose building-up process. For drums having large diameter, a fewer number are generally required because the diameter of the reinforcing threads is also large. Said units can be placed one on the top of the other and side by side in the proximity of the building-up machine. An unwinding system can be constructed from said units that needs only a small space and the effective utilization of space is much better than that of systems applied before.

The advantage of said system lies in the easy mobility of the platforms. The place of storage is separate from the location of unwinding. Hence, the hose building-up machine will not have to be stopped while the drums are recharged, operation is only ceased when an empty set of platforms is replaced. Another advantage is that the mode of operation can be changed very easily by the quick change of the whole unwinding system when hoses with reinforcing threads having other sizes, are to be manufactured. Hence, the machine is suitable to produce flexible hoses having various sizes for different purposes of application.

The unwinding system is only one part of the apparatus suitable to build-up hoses, mainly of large diameter and of large length having reinforcing layers.

Larger diameter means in this case a bore size of hoses from 50 mm to 1000 mm. A flexible hose is considered to be a long hose when its length exceeds 50 meters.

The apparatus according to the present invention is suitable to apply elements to a flexible core or to a precured flexible base The basic idea according to the invention is that the flexible base of the hose may be guided linearly along a curved track line.

The shape of the curved track lane can always be chosen depending on the building available and on the length of the hose to be manufactured. Care should be taken only to maintain a proper bending radius of the hose which is to be chosen in a manner that the internal structure of hose will not be damaged during the hose building-up operation. Suggested shape of the track is an elongated "O" but the track lane can be laid down to other shapes and it can be led on several levels one above the other. By the use of this method several hundred meter long hoses can be manufactured without requiring a long hall of that length. In most cases some hundred meter long work shops are not available.

In FIGS. 3-3c a flexible base 16 is led along a properly elongated "O" shaped track. The two ends of the track can be joined but an empty section between them is also permitted. The base 16 is led along the lane by properly designed and located supplementary support means.

The driving mechanisms 17 move back and forth on rails 18. The length of rails 18 is much shorter than the length of the flexible core. At the first section of the rail track a gripping means 19 of the driving mechanism 17 grips the base 16 by radially movable gripping elements 19a and starts to move towards the opposite end of the rail track so that meanwhile the gripping means 19 rotates. As a result of that advancing and rotating motion of the base, reinforcing threads 20 are twisted around the surface of the base 16 in a desired angle and alignment from a platform set 21 of the unwinding system by means of an aligner 22, a thread brake 23, preformer discs 24 and a press mechanism 25. The base 16, while being rotated and advanced along the track, behaves as a bent helical spring. The pressed and drawn threads alternate in accordance with the number of revolutions. The driving mechanism 17 stops at the end of the track of rails 18. The gripping means 19 disengages from holding the base already covered with reinforcement and the driving mechanism 17 moves with open gripping means back to the beginning part of track rail 18 for the next advancing operation. This sequence of alternating steps is repeated until base 16 is totally covered with reinforcing plies.

The description of the present invention makes it clear that the driving mechanism 17 should be suitable to provide an overpass for the base 16.

As is well known there are inventions which refer to apparatus where the base passes through a gripping mechanism but in these cases the gripping mechanism consists of one or more frag-screws which are also rotated around the centerline of their alignment. When hoses having a large bore are built up by such type of apparatus on the principle described above, the operation is very complicated and the machine itself has to have large dimensions. Drums for such known devices must have a diameter of approximately 10 meters. These drums are unwind and wind up the flexible base. These drums should also be rotated around an axis which is perpendicular to the axis of the drum itself and this is a very hard task to perform technically.

The driving mechanism 17 according to the present invention is kept to a small size in comparison to the diameter of the hose. In addition, drums rotated around two axles and having a large diameter, are avoided. The angular displacement of the flexible base by the building-up torque is much higher than the angular displacement of a base having a rigid core.

While the base 16 is released, the wound up reinforcing threads would loosen around the surface of the base 16. Therefore, as shown in FIGS. 3a and 3b, simultaneously with applying the reinforcing threads 20 but with another pitch a fixing ply 20a is applied to and wound around the surface of the base 16 through the fixing ply guiding unit 26, so that said fixing ply is positioned over the reinforcing threads 20 and it fixes them tight. The fixing ply is applied immediately behind the thread-aligner 22 and pressing mechanism 25.

Said hoses of large bore and length should be cured by heat-treatment. Vulcanization is very difficult because the hose should either be wound around large-diameter drums and put into autoclaves of proper size, or cured section by section in autoclaves, the covers of which are equipped with steamproof seals. Both are complicated and difficult techniques. When using the first method, it should be noted that the heating of the big autoclave involves considerable loss of energy.

According to the present invention, hoses are cured along the advance track itself. Hoses can be cured very advantageously by electric resistance heating. To both ends of the hose a power supply is connected to the wire reinforcement and said reinforcement—as resistors—is heated up. Thus, the hose is heated internally, therefore the loss of heat is minimal. It has been found that as a result of internal heating, adhesion between the plies is very good.

The flexible base 16 has to be supported. The upper level of a supporting roller located within the track rail 18 is located higher than the lower part of the cart of the driving mechanism 17, as is shown in FIG. 4a. One of the biggest problems with similar devices, where a base tending to hang through is to be supported, is the proper choice of the form of supporters.

The support means should extend downwardly to provide for a proper passing of the driving mechanism over them and later on, said support means should move up again to support the base.

By a known means, supporting rollers are located on a lever or other mechanism and they are positively moved upwards. The lifting force should be equal to or higher than the deadweight of base section per supporter, but said supporter cannot force the base to shut upward. Therefore, certain parts of the mechanism should be blocked so that movement of the supporting roller should be limited at the generating line of the base. In case of long tracks, said blocking effect can be controlled centrally by mechanical or hydraulic systems only in a difficult way. Also, a force acting upward can be moved upward only very difficultly in the case of heavy-weight hoses. Therefore, the applicability of such apparatus is rather limited.

A support means according to the present invention shown in FIGS. 4a and 4b, is designed in a manner that the centrally controlled blocking is eliminated, and the supporting system is in fact, a self-controlling system.

The base 16, which is advanced forward and rotated simultaneously, is supported by rollers 27 which allow movement in two directions. An axis 28 and grooved discs 29 having side-bearing support endless rubber bands 30 which are stretched in unloaded condition. Rollers with full rubber bands are used on very soft bases. Endless rubber bands are not suitable on harder bases. If so, the base is supported by discs having a rubber running surface only.

The distance between the sidewalls of the rollers 27 can be adjusted. This is necessary because of the various diameters of the bases. Adjustment is not necessary, of course, in every case when a hose is made with a new diameter but only at certain size intervals. Rubber bands 30 should be replaced also at certain size limits only.

The roller 27 can pivot about an axle 32 by means of a lifter 31. The torque generated by the weight of the hose is taken up by a fixing mechanism 33. When the driving mechanism 17 moves near to the roller 27, a switch releases the fixing mechanism 33. Releasing of the mechanism 33 can be activated also by auxiliary energy. Then, the master track of the driving mechanism 17 presses down the roller 27 by pressing rollers 35. When the driving mechanism 17 has passed, the roller 27 is lifted by a counterweight 36 up to the level of the base 16 and then, the fixing mechanism 33 receives a controlling impulse and the immediate position is fixed. Weight of the counterweight 36 is able to lift up the roller 27 safely while the base will not be deformed.

The flexible base is guided with supplementary support means 41 outside of the track 18 as is shown in FIG. 3a.

Said supplemental support means can be designed in several ways, e.g. they can be rollers allowing movement in two directions but also rollers having a belt and driving mechanisms providing advancing movement and rotation along a certain track can also be used.

The track consists of idler and driven elements of numbers calculated properly.

The apparatus shown in FIG. 3a is also suitable to manufacture flexible hoses with a rigid mandrel (not shown). In this case, the maximum production length is the same as the maximum straight section of the track. Because the angular deviation caused by the building-up moment in this case is not so high, the use of a fixing mechanism is not necessary.

Other possibilities are available for the manufacturing method with a rigid mandrel because the base moves on the driving mechanism 17.

When the same unwinding system 21, aligner 22, thread braking mechanism 23, preforming discs 24 and pressing unit 25 are aligned and located at the first end of the track, then the building operation can be completed in a back and forth manner because the base is always drawn with respect of the direction of building up.

Large-bore hoses can also be manufactured with a rigid mandrel when the diameter of the base is larger than that which can be handled by the gripping mechanism 19. The means in this case is to grip an adapter into a chuck in the gripping mechanism and to make the gripped end of the mandrel thin. The maximum length of hoses which can be built-up is the same as the length of the track.

Figures 5A, 5B:
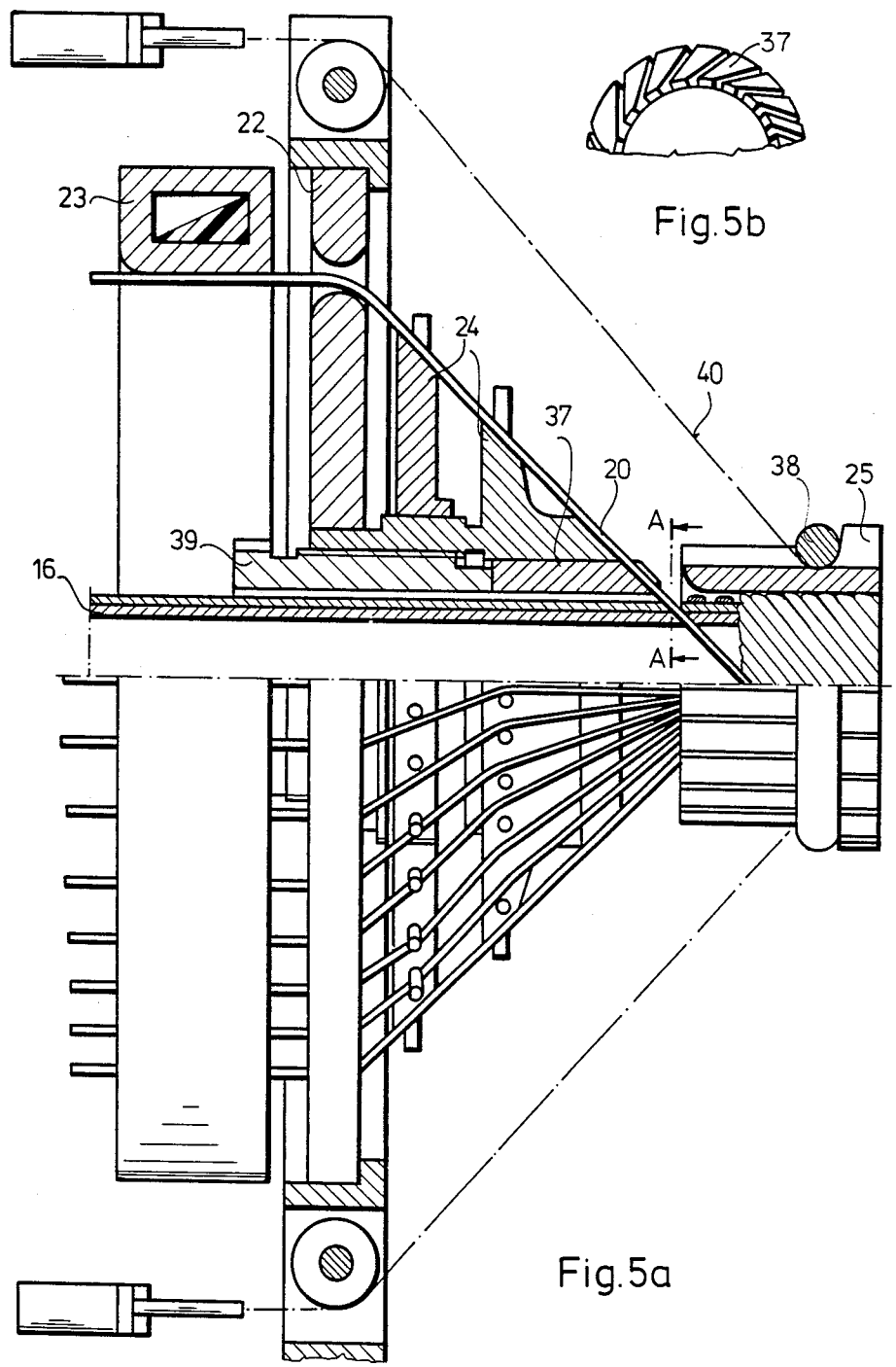
FIG. 5a shows the thread applying means during building-up of the reinforcement.
FIG. 5b is a cross section taken along line A—A of FIG. 5a, FIG. 6 shows the thread applying means after cutting and fixing of reinforcing plies.

FIG. 5a shows the tread guiding unit. Said guiding unit consists of four parts: the braking mechanism 23, aligner 22, pressing device 25 and preforming discs 24.

From the unwinding systems located on platform units, threads 20 are led first through an electro-magnetically operated breaking ring 23 and through the bores of the aligner 22 and they are moved through preforming discs 24 to a conical sleeve 37. From here threads 20 used for reinforcement are applied to the surface of the base 16 in an aligned manner and in the proper angle. Reinforcement thread 20 is pressed against the surface of the base 16 by an elastic pressing ring 25. The elastic presser 25 is pressed to the base 16 by a flexible ring 38. Therefore, the effeciency of the pressing is very good because approximately the same force will effect every reinforcing ply 20 and a uniform impression and stretch of the reinforcement can be provided for.

With the apparatus according to the present invention, the drums are influenced by only one braking effect which eliminates the loosening of threads combined with a means that provides the gradual smooth start and stop of the machine as required instead of a jerky mode of operation.

The elements of the reinforcement 20 adhere to the inside of the electro-magnetic braking ring 23 as shown in FIG. 5a. The adhesion depends on the level of induction which also defines the friction. The elements of electromagnetic reinforcement 20 are guided through the preforming discs 24 over a breaking point and the distance between two preforming discs can be modified. A frictional force here also arises. The constant tensile stress generated by the magnetic adhesion and during preforming is superimposed to a slightly variable tensile stress originating from the braking of the drums. The electro-magnetic induction is modified during the hose building-up operation, depending on the reduction of the diameter of the drums, so that the value of the resulting tensile stresses in the threads of the reinforcement measured in the area of their guiding to the surface of the base is always substantially constant. Because in a given minute of the building up operation the quantity of the reinforcing elements on the drums and also the diameters of the drums are the same, the sensing of the reduction of one drum's diameter is sufficient for controlling the electro-magnetic induction.

A conical sleeve 37 located in the guiding unit can be changed depending on the diameter of the base 16. If a placing of the reinforcing elements 20 close to each other on the base 16 surface is not required, a cogged conical sleeve 37 as shown in FIG. 5b should be used. Hence, the reinforcing elements are always to be guided to the surface of the base 16 with the density required.

When no total coverage of the base is specified, together with the guiding of the reinforcing threads to the base but with a different pitch, a fixing ply can be applied for both a rigid, or a flexible mandrel building-up system. This fixing ply eliminates shifting of the already applied reinforcement on the base surface while keeping the distance between two plies. The reinforcing threads 20 shall always remain between the cogs. This can be provided for in a way that the conical sleeve 37 is adjusted slightly forward by means of a threaded sleeve 39 whereby the reinforcing threads are guided securely within grooves of the cogs, since they are always slightly prestretched.

Figure 6:
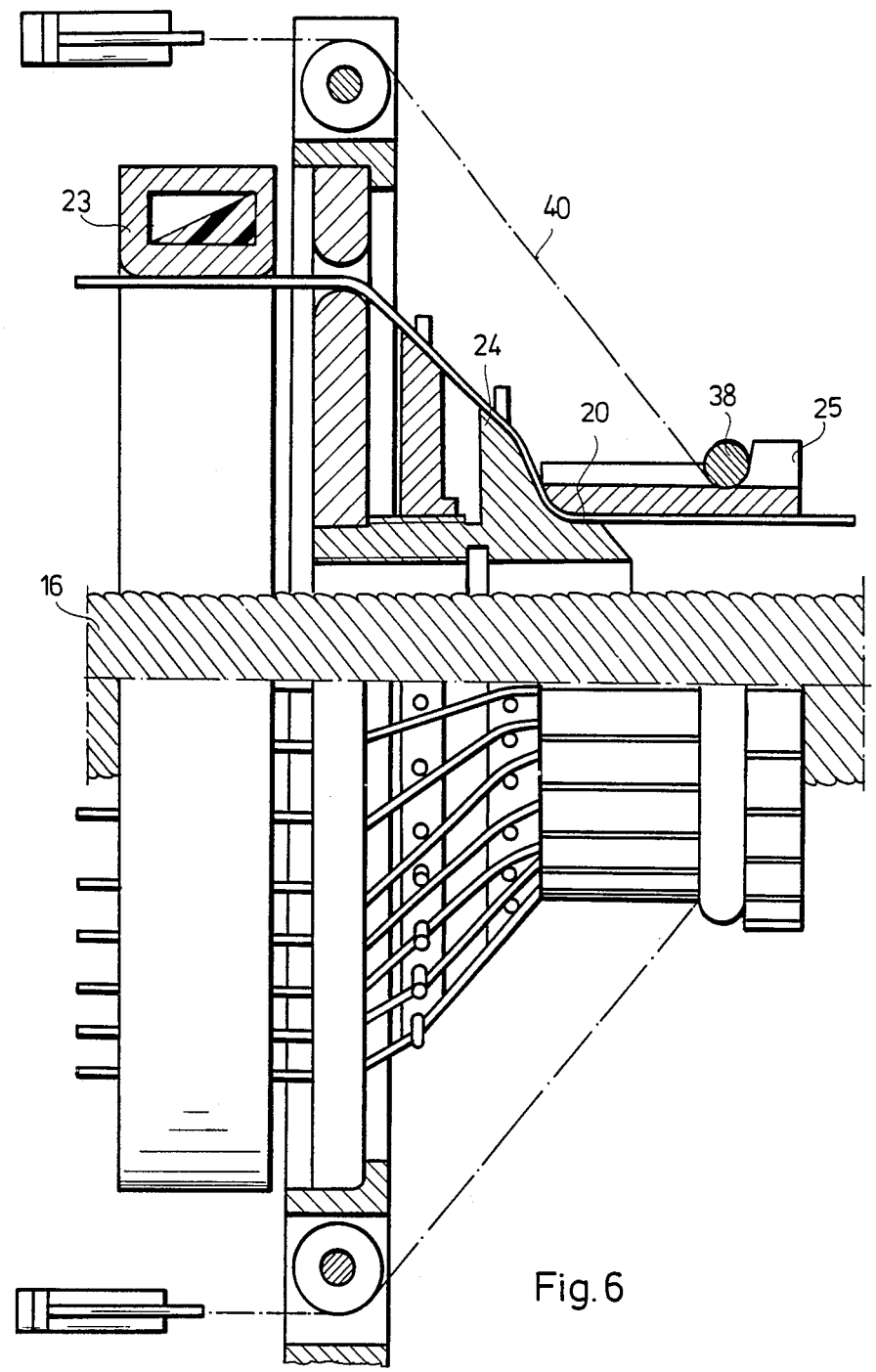

After the hose building-up operation is finished for a desired length of hose, the reinforcing threads 20 are cut at a point behind the elastic press mechanism 25 and they are fixed to the base 16 to avoid loosening. The press mechanism 25 may serve simultaneously as a fixing device for the free thread end, since it may be drawn through the flexible ring 38 along the base axis by ropes 40, as is shown in FIG. 6. In this position the press mechanism 25 presses the reinforcing threads 20 to the front surface of the preforming disc 24. The conical sleeve 37 and threaded sleeve 39 shown in FIG. 5a may now be replaced and changed against another set of tools having sizes to allow applying the reinforcing plies of the subsequent layer of increased diameter to the hose structure.

As already mentioned above, a hose manufacturing device of the kind invented can also be designed by using means other than described in the present specification. Several other embodiments of the apparatus are possible when designing the supporting and moving elements, composing the track, etc. Instead of using supporting rollers as described above, also throughed tracks having a low friction coefficient may also be used. Grips driven by a hydraulic motor with alternating movement can also be applied for transmitting the torsional torque to the hose along the track. From the various possible means as indicated above, depending on the given task the optimal system should be selected.

What we claim is:

1. An apparatus for manufacturing reinforced flexible hoses, having
    (a) means for storing and unwinding reinforcing threads for building the reinforced hose on a flexible hose base, said means comprising a plurality of joinable and removable drum supporting platforms as a thread supplying means for simultaneously applying up to about a thousand reinforcing threads to the flexible hose base, said means for storing and unwinding being stationary with respect to the flexible hose base during the application of the reinforcing threads thereto, whereby upon the exhaustion of the threads from said platforms, said platforms can be readily replaced with other platforms having drums with a full complement of threads thereon;
    (b) at least one driving mechanism adapted to travel over a pair of tracks and positively gripping said hose for advancing and rotating the gripped hose;
    (c) supporting elements for said flexible hose, said supporting elements being disposed within said tracks of said at least one driving mechanism, and being of adjustable height that is automatically adjusted and controlled by contact with the hose while it is being manufactured, and a given one or more supporting elements is depressed out of contact with the hose by said at least one driving mechanism when said mechanism travels on said tracks above said given supporting elements; and
    (d) supplementary support means disposed under the hose outside of said tracks of said at least one driving mechanism, which supplementary support means support, allow and/or promote the advancing and rotating movement of said hose.

2. The apparatus of claim 1, wherein said reinforcing threads are of metal, the apparatus further comprising means for supplying electrical current to said metal reinforcing threads deposited onto the flexible base, for electrically generating heat for vulcanizing and/or curing the material of the hose.

3. The apparatus of claim 1 further comprising means for applying a fixing ply to the hose, said fixing ply keeping and fixing said reinforcing threads in position, said fixing ply being applied at a different pitch to the flexible base than the pitch of said reinforcing threads.

4. The apparatus of claim 1 further comprising thread applying means equipped with a cogged, tapered sleeve which provides the thread coverage required on the flexible hose base surface.

5. The apparatus of claim 1 wherein said driving mechanism has a central hole and radially moving gripping elements to grip the hose within said central hole.

* * * * *